United States Patent
Dai et al.

(10) Patent No.: US 10,951,105 B2
(45) Date of Patent: Mar. 16, 2021

(54) GEARED SPHERICAL ELECTROMAGNETIC MACHINE WITH TWO-AXIS ROTATION

(71) Applicant: HONEYWELL INTERNATIONAL INC., Morris Plains, NJ (US)

(72) Inventors: Zhijun Dai, Shanghai (CN); Chao Wang, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 158 days.

(21) Appl. No.: 16/381,744

(22) Filed: Apr. 11, 2019

(65) Prior Publication Data

US 2020/0328667 A1 Oct. 15, 2020

(51) Int. Cl.
| | |
|---|---|
| *H02K 41/06* | (2006.01) |
| *H02K 7/08* | (2006.01) |
| *H02K 13/00* | (2006.01) |
| *H02K 7/116* | (2006.01) |

(52) U.S. Cl.
CPC ........... *H02K 41/065* (2013.01); *H02K 7/08* (2013.01); *H02K 7/116* (2013.01); *H02K 13/003* (2013.01); *H02K 2201/18* (2013.01)

(58) Field of Classification Search
CPC .... H02K 41/031; H02K 2201/18; H02K 7/02; H02K 15/08
USPC .................... 310/38, 82, 156.43, 179, 323.06
See application file for complete search history.

(56) References Cited

U.S. PATENT DOCUMENTS

| | | | | | |
|---|---|---|---|---|---|
| 3,183,725 | A | * | 5/1965 | Frye | G01C 19/20 74/5.7 |
| 4,610,172 | A | * | 9/1986 | Mickle | G01C 19/24 250/231.12 |
| 4,628,765 | A | * | 12/1986 | Dien | B25J 17/0275 74/665 A |
| 5,533,418 | A | * | 7/1996 | Wu | B25J 9/102 248/181.1 |
| 7,675,208 | B2 | * | 3/2010 | Bandera | H02K 7/14 310/80 |
| 7,905,463 | B2 | | 3/2011 | Burnham et al. | |
| 7,969,375 | B2 | | 6/2011 | Blalock | |
| 8,080,911 | B2 | | 12/2011 | Won et al. | |
| 9,000,628 | B1 | * | 4/2015 | Ho | H02K 41/031 310/36 |
| 10,326,348 | B2 | * | 6/2019 | Bandera | H02K 41/031 |
| 2004/0232790 | A1 | | 11/2004 | Mendenhall | |
| 2009/0230787 | A1 | * | 9/2009 | Won | H02K 41/03 310/38 |
| 2010/0207488 | A1 | * | 8/2010 | Ting | H02N 2/16 310/323.06 |
| 2013/0127285 | A1 | * | 5/2013 | Yano | H02K 41/031 310/156.43 |
| 2017/0012482 | A1 | * | 1/2017 | Bandera | H02K 1/27 |
| 2017/0012492 | A1 | * | 1/2017 | Bandera | H02K 41/031 |

(Continued)

FOREIGN PATENT DOCUMENTS

| | | |
|---|---|---|
| CN | 102029614 B | 5/2012 |
| EP | 3249794 A2 | 11/2017 |

*Primary Examiner* — Jose A Gonzalez Quinones
(74) *Attorney, Agent, or Firm* — Lorenz & Kopf, LLP (57) ABSTRACT

A geared spherical electromagnetic machine with two-axis rotation includes an inner frame, an outer frame, a spherical body, a first coil, a second coil, a third coil, a first hemispherical body, a second hemispherical body, a first plurality of inner magnets, a second plurality of inner magnets, a first gearbox, and a second gearbox.

19 Claims, 6 Drawing Sheets

(56) References Cited

U.S. PATENT DOCUMENTS

2017/0040861 A1\* 2/2017 Ho .................... H02K 15/08
2017/0349298 A1\* 12/2017 Tian .................. G03B 17/561
2018/0273212 A1\* 9/2018 Zhu ................... G01C 19/24

\* cited by examiner

GEARED SPHERICAL ELECTROMAGNETIC MACHINE WITH TWO-AXIS ROTATION

TECHNICAL FIELD

The present invention generally relates to electromagnetic machines, and more particularly relates to a geared spherical electromagnetic machine with two-axis rotation.

BACKGROUND

It is generally known that currently available motion control systems that are designed to move an object in more than one degree of freedom (DoF) include a separate motor or actuator for each DoF. More specifically, at least two motors or actuators are needed to implement 2-DoF motion, at least three motors or actuators are needed to implement 3-DoF motion, and so on. Consequently, mechanisms that involve more than one DoF tend to be somewhat large and cumbersome, and therefore inefficient.

Various attempts have been made to develop electromagnetic machines (e.g., motors) that can rotate in multiple degrees-of-freedom. For example, various spherical motor configurations have been developed. However, the spherical motors heretofore developed suffer certain drawbacks. For example, the spherical motors presently known supply relatively low output torque. As such, these spherical motors cannot be implemented in systems that rely on relatively high output torque.

Hence, there is a need for a spherical electromagnetic machine that can supply the relatively higher output torque requirements of many industrial applications. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a geared spherical electromagnetic machine with two-axis rotation includes an inner frame, an outer frame, a spherical body, a first coil, a second coil, a third coil, a first hemispherical body, a second hemispherical body, a first plurality of inner magnets, a second plurality of inner magnets, a first gearbox, and a second gearbox. The outer frame disposed adjacent to, and configured to rotate relative to, the inner frame. The spherical body has a first axis of symmetry, a second axis of symmetry, and a third axis of symmetry. The first, second, and third axes of symmetry are disposed perpendicular to each other. The spherical body is rotationally coupled to the inner frame, and is rotatable, relative to the inner frame and the outer frame, about the first axis of symmetry. The first coil is wound on the spherical armature about the first axis of symmetry, the second coil is wound on the spherical armature about the second axis of symmetry, and the third coil is wound on the spherical armature about the third axis of symmetry. The first hemispherical body is spaced apart from, and surrounds a first portion of, the spherical body. The first hemispherical body is rotationally coupled to the outer frame, and is rotatable, relative to the inner frame, the outer frame, and the spherical body, about the second axis of symmetry. The first hemispherical body includes a first hemispherical body inner surface and a first hemispherical body outer surface. The second hemispherical body is spaced apart from, and surrounds a second portion of, the spherical body. The second hemispherical body is rotationally coupled to the outer frame, and is rotatable, relative to the inner frame, the outer frame, and the spherical body, about the second axis of symmetry. The second hemispherical body includes a second hemispherical body inner surface and a second hemispherical body outer surface. The first plurality of inner magnets is coupled to the first hemispherical body inner surface, and the second plurality of inner magnets is coupled to the second hemispherical body inner surface. The first gearbox is mounted on the inner frame and is coupled to the spherical body, and the second gearbox is mounted on the outer frame and is coupled to the first hemispherical body.

In another embodiment, a geared spherical electromagnetic machine with two-axis rotation includes an inner frame, an outer frame, a spherical body, a first coil, a second coil, a third coil, a first hemispherical body, a second hemispherical body, a first plurality of inner magnets, a second plurality of inner magnets, a first gearbox, a second gearbox, and a third gearbox. The outer frame disposed adjacent to, and configured to rotate relative to, the inner frame. The spherical body has a first axis of symmetry, a second axis of symmetry, and a third axis of symmetry. The first, second, and third axes of symmetry are disposed perpendicular to each other. The spherical body is rotationally coupled to the inner frame, and is rotatable, relative to the inner frame and the outer frame, about the first axis of symmetry. The first coil is wound on the spherical armature about the first axis of symmetry, the second coil is wound on the spherical armature about the second axis of symmetry, and the third coil is wound on the spherical armature about the third axis of symmetry. The first hemispherical body is spaced apart from, and surrounds a first portion of, the spherical body. The first hemispherical body is rotationally coupled to the outer frame, and is rotatable, relative to the inner frame, the outer frame, and the spherical body, about the second axis of symmetry. The first hemispherical body includes a first hemispherical body inner surface and a first hemispherical body outer surface. The second hemispherical body is spaced apart from, and surrounds a second portion of, the spherical body. The second hemispherical body is rotationally coupled to the outer frame, and is rotatable, relative to the inner frame, the outer frame, and the spherical body, about the second axis of symmetry. The second hemispherical body includes a second hemispherical body inner surface and a second hemispherical body outer surface. The first plurality of inner magnets is coupled to the first hemispherical body inner surface, and the second plurality of inner magnets is coupled to the second hemispherical body inner surface. The first gearbox is mounted on the inner frame and is coupled to the spherical body, the second gearbox is mounted on the outer frame and is coupled to the first hemispherical body, and the third gearbox is mounted on the outer frame and coupled to the second hemispherical body. The first, second, and third gearbox each have a gear ratio greater than 1.0.

In yet another embodiment, a geared spherical electromagnetic machine with two-axis rotation includes an inner frame, an outer frame, a spherical body, a first coil, a second coil, a third coil, a first hemispherical body, a second hemispherical body, a first plurality of inner magnets, a first plurality of outer magnets, a second plurality of inner magnets, a second plurality of outer magnets, a first gearbox, a second gearbox, a third gearbox, first, second, and third shafts, and first, second, and third bearing assemblies. The outer frame disposed adjacent to, and configured to rotate relative to, the inner frame. The spherical body has a first axis of symmetry, a second axis of symmetry, and a third axis of symmetry. The first, second, and third axes of symmetry are disposed perpendicular to each other. The spherical body is rotationally coupled to the inner frame, and is rotatable, relative to the inner frame and the outer frame, about the first axis of symmetry. The first coil is wound on the spherical armature about the first axis of symmetry, the second coil is wound on the spherical armature about the second axis of symmetry, and the third coil is wound on the spherical armature about the third axis of symmetry. The first hemispherical body is spaced apart from, and surrounds a first portion of, the spherical body. The first hemispherical body is rotationally coupled to the outer frame, and is rotatable, relative to the inner frame, the outer frame, and the spherical body, about the second axis of symmetry. The first hemispherical body includes a first hemispherical body inner surface and a first hemispherical body outer surface. The second hemispherical body is spaced apart from, and surrounds a second portion of, the spherical body. The second hemispherical body is rotationally coupled to the outer frame, and is rotatable, relative to the inner frame, the outer frame, and the spherical body, about the second axis of symmetry. The second hemispherical body includes a second hemispherical body inner surface and a second hemispherical body outer surface. The first plurality of inner magnets is coupled to the first hemispherical body inner surface, and the first plurality of outer magnets is coupled to the first hemispherical body outer surface. The second plurality of inner magnets is coupled to the second hemispherical body inner surface, and the second plurality of outer magnets is coupled to the second hemispherical body outer surface. The first gearbox is mounted on the inner frame and is coupled to the spherical body, the second gearbox is mounted on the outer frame and is coupled to the first hemispherical body, and the third gearbox is mounted on the outer frame and coupled to the second hemispherical body. The first shaft is coupled to the spherical body and the first gearbox, and the first bearing is disposed between the first shaft and the inner frame. The second shaft is coupled to the first hemispherical body and the second gearbox, and the second bearing is disposed between the second shaft and the outer frame. The third shaft is coupled to the second hemispherical body and the third gearbox, and the third bearing is disposed between the third shaft and the outer frame.

Furthermore, other desirable features and characteristics of the geared spherical electromagnetic machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
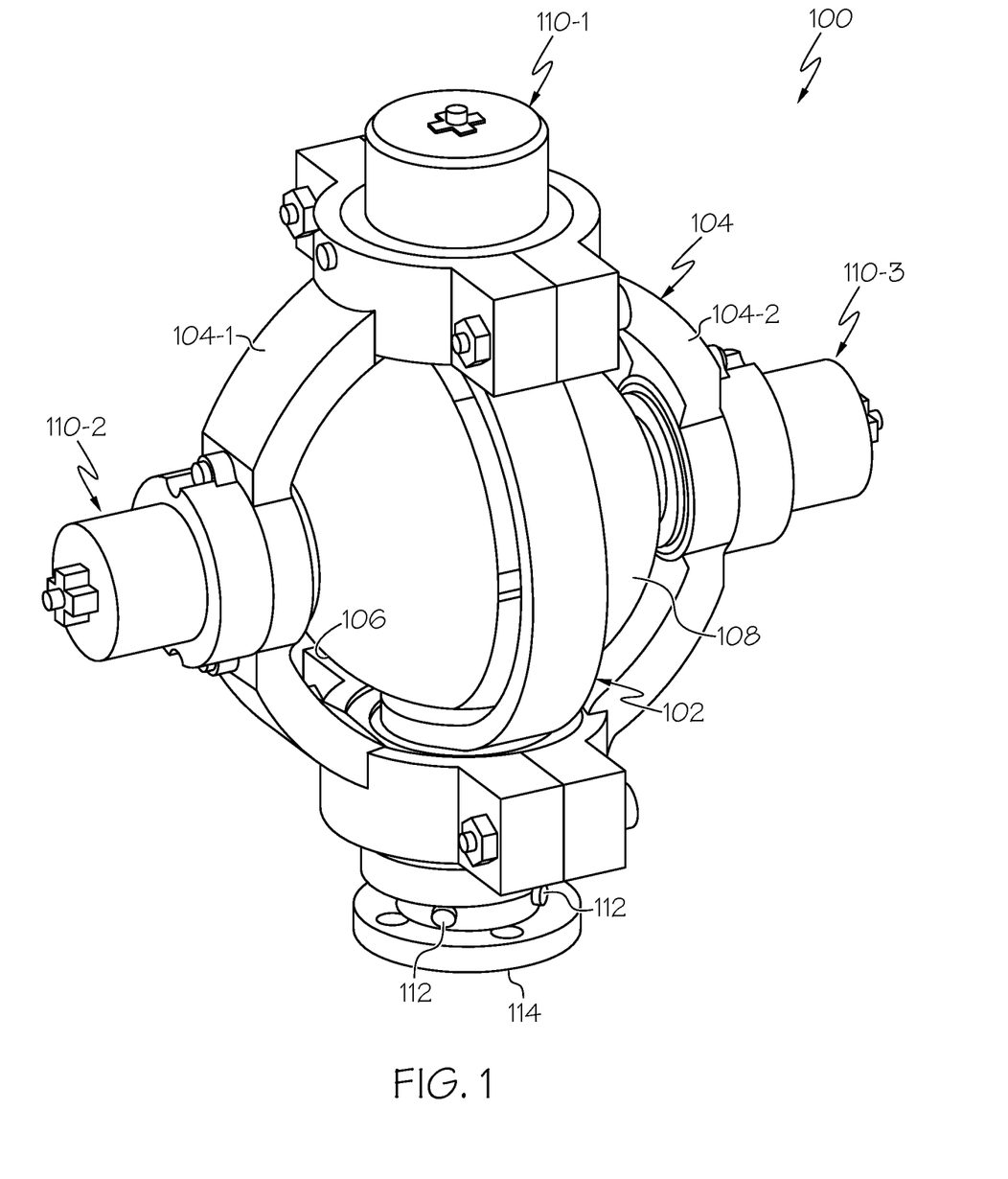
FIG. 1 depicts a perspective view of one embodiment of a geared spherical electromagnetic machine.
Figure 2:
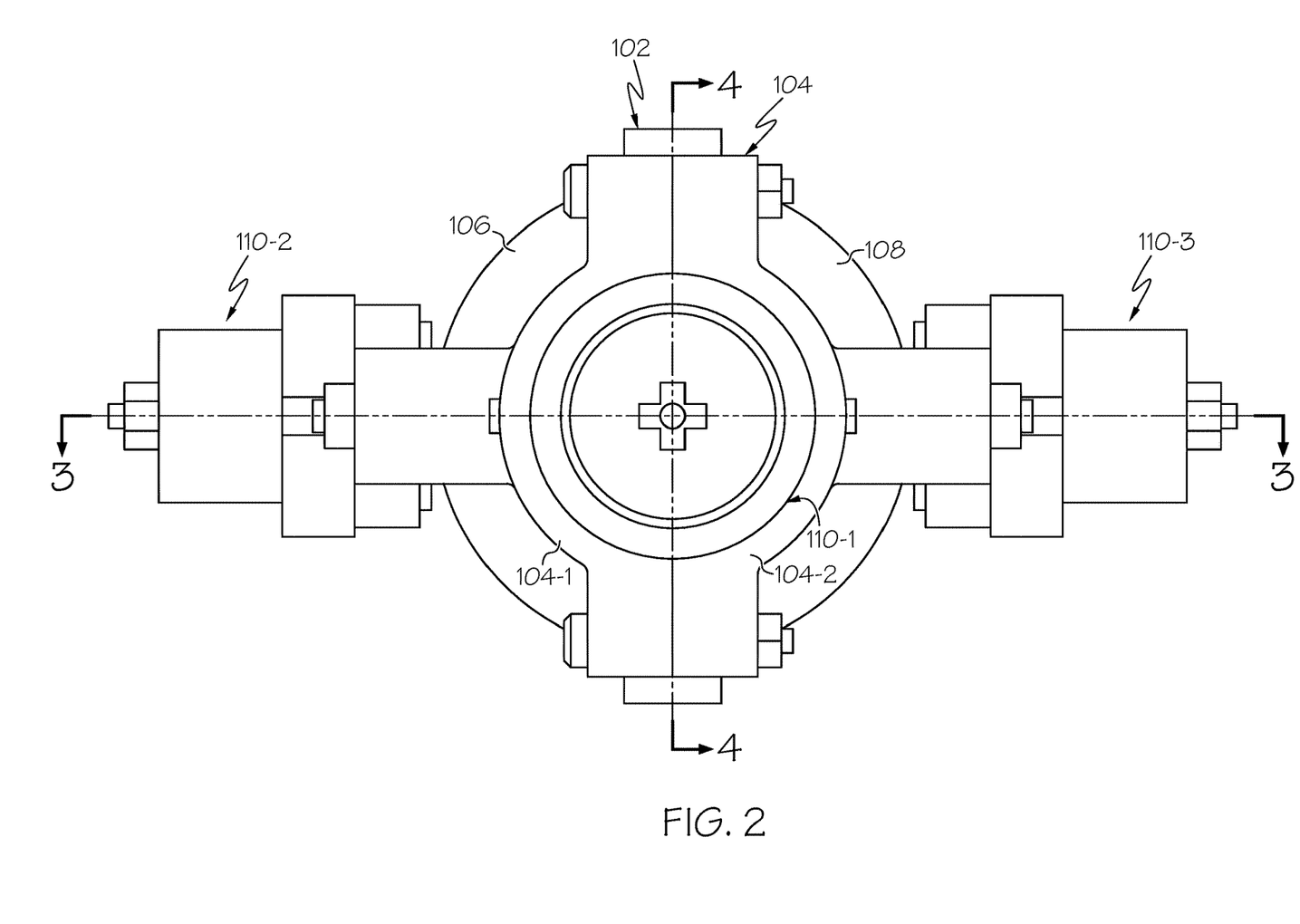
FIG. 2 depicts a top view (FIG. 2) of the geared spherical electromagnetic machine of FIG. 1.

Referring first to FIGS. 1-4, a perspective view (FIG. 1), a top view (FIG. 2), a cross section view taken along line 3-3 in FIG. 2 (FIG. 3), and a cross section view taken along line 4-4 in FIG. 2 (FIG. 4), respectively, of one embodiment of a geared spherical electromagnetic machine 100 with two-axis rotation is depicted. The depicted spherical machine 100 includes an inner frame 102, an outer frame 104, a spherical body 302 (not visible in FIGS. 1 and 2), a first hemispherical body 106, a second hemispherical body 108, and a plurality of gearboxes 110 (e.g., 110-1, 110-2, 110-3). Although three gearboxes 110 are included in the depicted embodiment, it will be appreciated that the spherical machine 100 could be implemented with less than this number of gearboxes.

The inner frame 102 is fixedly coupled, via suitable mounting hardware 112, to a mounting flange 114. The mounting flange 114 is configured, using suitable non-illustrated hardware, to be fixedly mounted to a surface. In this manner, when the geared spherical electromagnetic machine 100 is mounted, via the mounting flange 114, to a surface, the inner frame 102 is mounted against rotation. The inner frame 102, at least in the depicted embodiment, is implemented as a single integral structure. It will be appreciated that this is merely exemplary and that the inner frame 102 could be implemented using multiple parts, if needed or desired.

Figure 3:
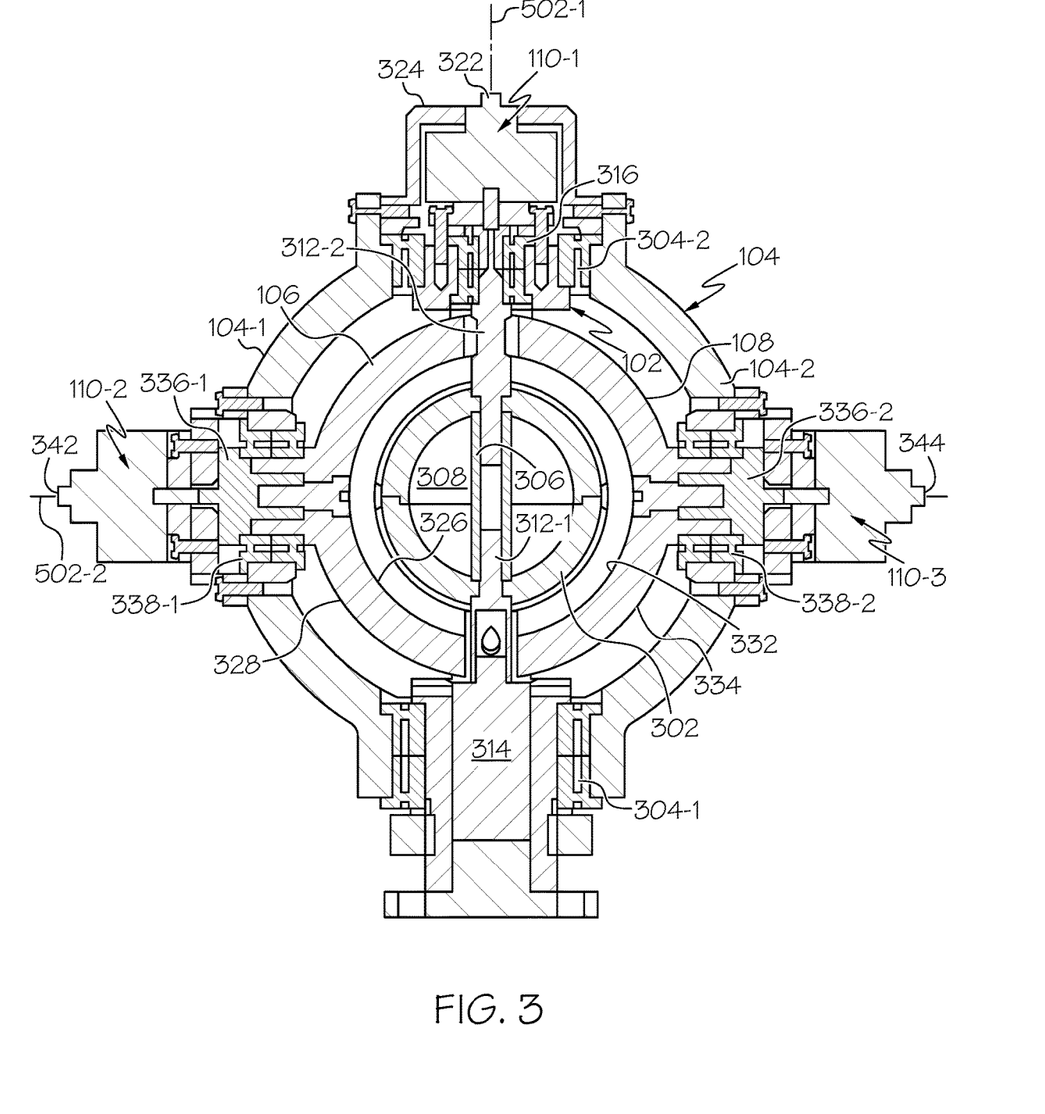
FIG. 3 depicts a cross section view of the geared spherical electromagnetic machine of FIG. 1 taken along line 3-3 in FIG. 2.

The outer frame 104 is disposed adjacent to, and is configured to rotate relative to, the inner frame 102. To implement this functionality, and as FIG. 3 depicts more clearly, a plurality of bearing assemblies 304—referred to herein, for convenience, as a lower bearing assembly 304-1 and an upper bearing assembly 304-2—are disposed between the inner frame 102 and outer frame 104. The bearing assemblies 304 may be implemented using any one of numerous types of bearing assemblies. Some non-limiting examples include any one of numerous types of ball bearing assemblies or sliding bearing assemblies. As FIGS. 1-3 also depict, the outer frame 104, at least in the depicted embodiment, is implemented using two frame halves—a first frame half 104-1 and a second frame half 104-2. It will be appreciated that this is merely exemplary and that the outer frame 104 could be implemented using more or less than this number of parts, if needed or desired.

Figure 5:
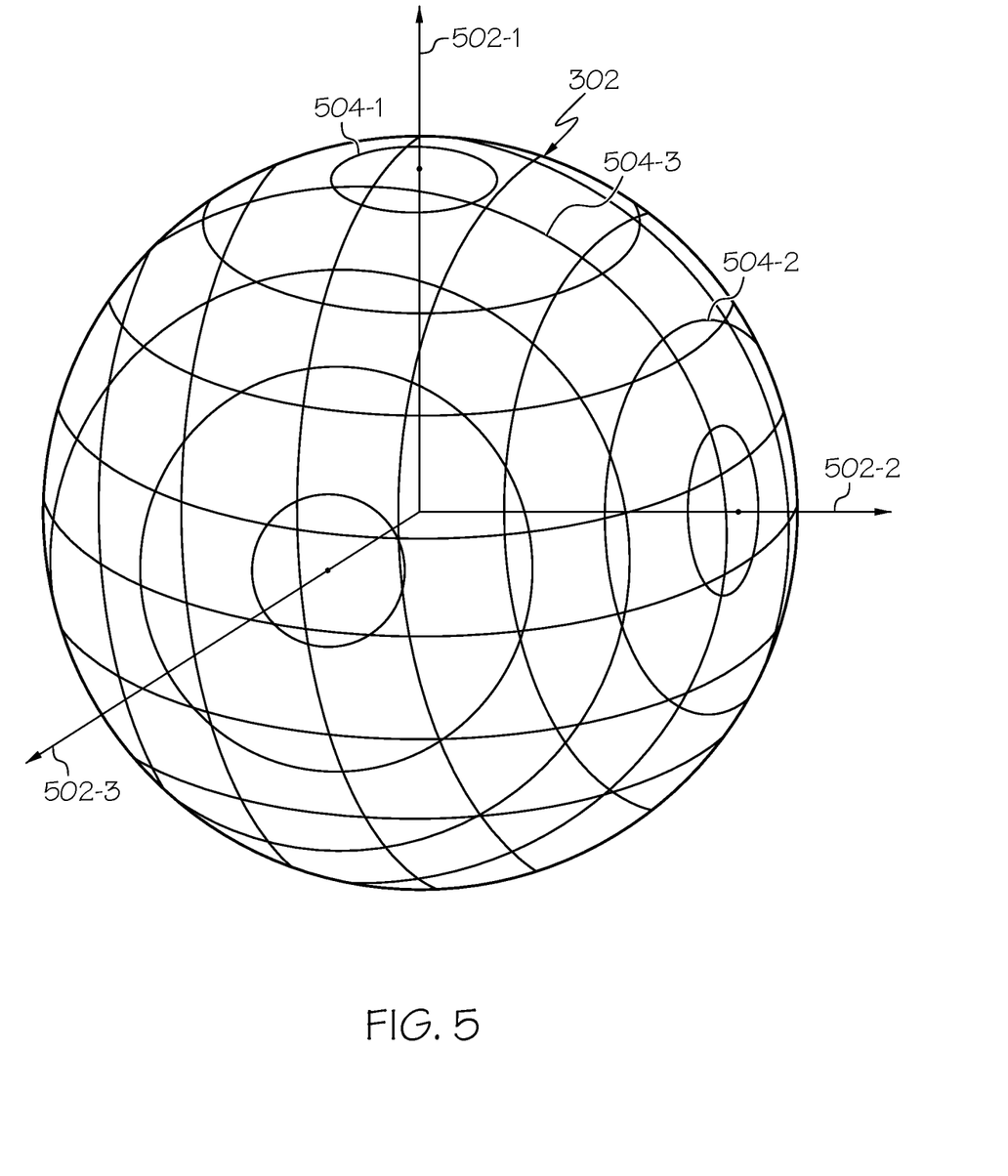
FIG. 5 depicts a perspective view of an embodiment of a spherical body with orthogonally arranged coils wound thereon.

The spherical body 302, which is shown more clearly in FIG. 5, has three perpendicularly disposed axes of symmetry—a first axis of symmetry 502-1, a second axis of symmetry 502-2, and a third axis of symmetry 502-3. The spherical body 302 additionally has a plurality of coils 504 wound thereon. In the depicted embodiment, these include a first coil 504-1, a second coil 504-2, and a third coil 504-3. It will be appreciated, however, that in some embodiments the geared spherical electromagnetic machine 100 may be implemented with only two coils instead of three. The first coil 504-1 is wound on the spherical body 302 about the first axis of symmetry 502-1, the second coil 504-2 is wound on the spherical body 302 about the second axis of symmetry 502-2, and the third coil 504-3, when included, is wound on the spherical body 302 about the third axis of symmetry 502-3. It should be noted that a sphere has an infinite number of axes of symmetry. Thus, the first, second, and third axes of symmetry 502-1, 502-2, 502-3, could be any one of these axes of symmetry, so long as all three axes of symmetry are perpendicular to each other.

Figure 4:
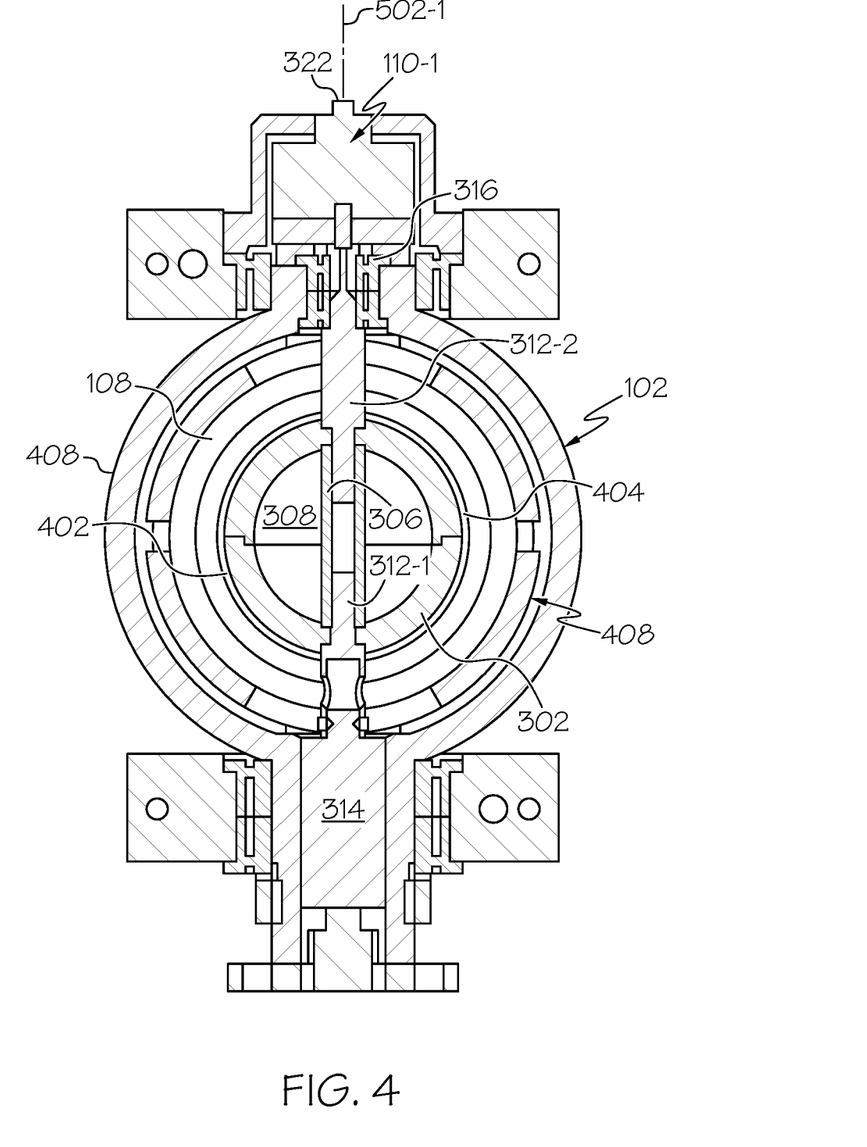
FIG. 4 depicts a cross section view of the geared spherical electromagnetic machine of FIG. 1 taken along line 4-4 in FIG. 2.

The spherical body 302 is rotatable, relative to both the inner frame 102 and the outer frame 104, about the first axis of symmetry 502-1. To do so, the spherical body 302, at least in the depicted embodiment, is implemented using two hollow hemispherical portions that are joined together, with each half including a connector portion that extends radially inwardly. Thus, as FIGS. 3 and 4 depict, when assembled, the spherical body 302 includes a connector tube 306 that extends across the inner volume 308 of the spherical body 302. A pair of shafts 312—referred to herein for convenience as a lower shaft 312-1 and an upper shaft 312-2—extend into different ends of, and engage, the connector tube 306. Thus, rotation of the spherical body 302, and concomitantly the connector tube 306, results in rotation of the shafts 312.

The lower shaft 312-1 is coupled to a slip ring 314, which is in turn coupled to the mounting flange 114. The slip ring 314, as is generally known, transfers electrical power to the coils 504 wound on the spherical body 302. The upper shaft 312-2 extends through an inner bearing assembly 316, which is disposed between the upper shaft 312 and the inner frame 102 and which may be implemented using any one of numerous ball bearing assemblies or sliding bearing assemblies. The upper shaft 312-2 is also coupled to one of the gearboxes 110 (the first gearbox 110-1).

The first gearbox 110-1 is mounted on, via suitable mounting hardware, the inner frame 102. The first gearbox 110-1 includes a first gearbox output shaft 322 that receives the torque from the spherical body 302, via the upper shaft 312-2, when the spherical body 302 rotates. The first gearbox output shaft 322 extends through an opening in, and engages, a first gearbox cover 324. The first gearbox cover 324 is fixedly coupled to the outer frame 104. Thus, when the spherical body 302 rotates about the first axis of symmetry 502-1, the outer frame 104 also rotates about the first axis of symmetry 502-1. However, due to the gear ratio of the first gearbox 110-1 (discussed further below), the speed at which the outer frame 104 rotates will be less than that of the spherical body 302, but the output torque is greater.

Turning now to the other portions of the machine 100, it is seen that the first hemispherical body 106 is spaced apart from, and surrounds a first portion of, the spherical body 302, and includes a first hemispherical body inner surface 326 and a first hemispherical body outer surface 328. The second hemispherical body 108 is spaced apart from, and surrounds a second portion of, the spherical body 302, and includes a second hemispherical body inner surface 332 and a second hemispherical body outer surface 334. The first hemispherical body 106 and the second hemispherical body 108 are both rotationally coupled to the outer frame 104, and are both rotatable, about the second axis of symmetry 502-2, relative to the inner frame 102, the outer frame 102, and the spherical body 302. To implement this functionality, the machine 100 additionally includes two shaft assemblies 336—referred to herein for convenience as a first shaft assembly 336-1 and a second shaft assembly 336-2—and two outer frame bearing assemblies 338—referred to herein for convenience as a first outer frame bearing assembly 338-1 and a second outer frame bearing assembly 338-2.

The first shaft assembly 336-1 is coupled to the first hemispherical body 106, via suitable hardware, and is rotationally mounted on the first outer frame bearing assembly 338-1, which is in turn coupled to the outer frame 104. The first shaft assembly 336-1 is coupled to a second gearbox 110-2, which is mounted on the outer frame 104. The second shaft assembly 326-2 is coupled to the second hemispherical body 108, via suitable hardware, and is rotationally mounted on the second outer frame bearing assembly 328-2, which is also coupled to the outer frame 104. The second shaft assembly 336-1 is coupled to a third gearbox 110-3, which is mounted on the outer frame 104. The second and third gearboxes 110-2, 110-3 have second and third gearbox output shafts 342, 344, respectively, which are coupled to a non-illustrated payload.

With the above-described configuration, when the first and second hemispherical bodies 106, 108 rotate about the second axis of symmetry 502-2, the second and third gearbox output shafts 342, 344 also rotate. However, due to the gear ratio of the second and third gearboxes 110-2, 110-3 (discussed further below), the speed at which the second and third gearbox output shafts 342, 344 rotate will be less than that of the first and second hemispherical bodies 106, 108, but the output torques are greater.

Referring now to FIG. 4, it is seen that a first plurality of inner magnets 402 is coupled to the first hemispherical body inner surface 326, and a second plurality of inner magnets 404 is coupled to the second hemispherical body inner surface 332. Although the first and second plurality of inner magnets 402, 404 may vary in shape and number and configuration, in the depicted embodiment, each is shaped like a fraction of a hemisphere (e.g., wedge-shaped), and there are four total inner magnets—two first inner magnets 402-1, 402-2 and two second inner magnets 404-1, 404-2—not all of which are visible in FIG. 4.

In some embodiments, it may be desirable to include additional magnets. These additional magnets, when included, provide a coupling force that ensures the first and second hemispherical bodies 102, 104 rotate synchronously. These additional magnets, which are included in the depicted embodiment, are coupled to the first and second hemispherical body outer surfaces 328, 334, and are thus referred to herein as outer magnets. In particular, the depicted machine 100 includes a first plurality of outer magnets 406 and a second plurality of outer magnets 408. Each of the first plurality of outer magnets 406 is coupled to the first hemispherical body outer surface 328, and each of the second plurality of outer magnets 408 is coupled to the second hemispherical body outer surface 334. Although the first and second plurality of outer magnets 406, 408 may vary in shape and number and configuration, in the depicted embodiment, each is arc shaped, and there are eight total outer magnets—four first outer magnets 406-1, 406-2, 406-3, 406-4 and four second outer magnets 408-1, 408-2, 408-3, 408-4—not all of which are visible in FIG. 4.

Figure 6:
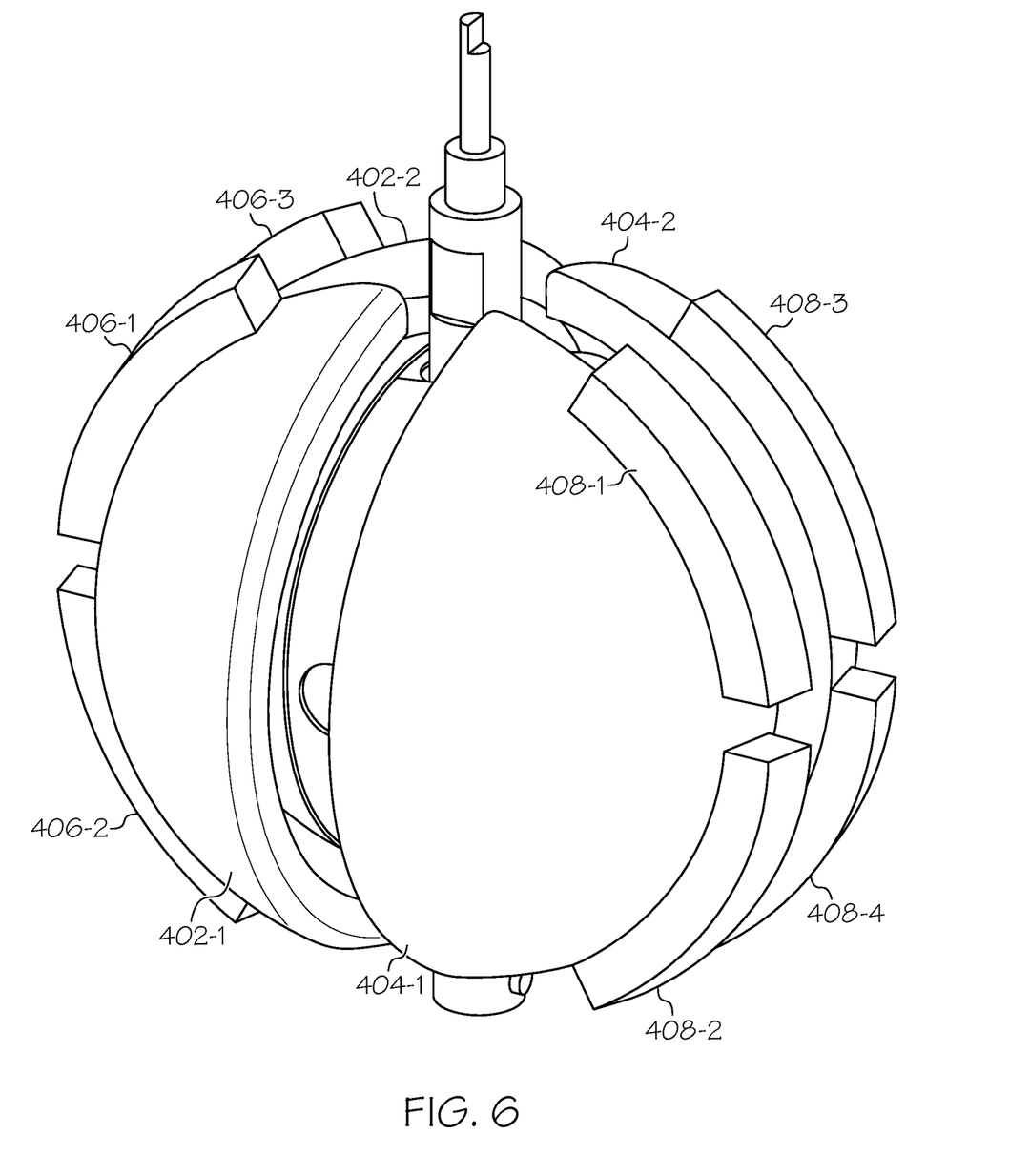
FIG. 6 depicts the relative positions of the various magnets that are used to implement the spherical electromagnetic machine of FIG. 1, but with portions of the machine removed for clarity.

Before proceeding further, FIG. 6 is included herewith to provide added clarity regarding the configuration and relative positions of each of the inner 402, 404 and outer 406, 408 magnets. In this figure, the relative positions of the inner 402, 404 and outer 406, 408 magnets are shown with the first and second first and second hemispherical bodies 106, 108 being removed, although the spherical body 302 is depicted. It should be noted that one of the second outer magnets (e.g., 408-4) is not visible in FIG. 6, but its placement is understood to those skilled in the art.

Because of the configuration of the coils 502 and the magnets 402, 404, 406, 408, when an electrical current is supplied to one or more of the coils 502, a Lorentz force is generated between the energized coil(s) 502 and the magnets 402, 404, 406, 408, which in turn generates in a torque about one or more of the axes of symmetry 504. The direction of the generated torque, as may also by appreciated, is based on the direction of the current flow in the coil(s) 502.

In particular, the spherical body 302, and thus the outer frame 103, can be made to rotate about the first axis of symmetry 502-1 by controllably energizing the second and third coils 504-2, 504-3 with alternating electrical currents that are equal in amplitude and 90-degrees out of phase. The first and second hemispherical bodies 106, 108 can be made to rotate about the second axis of symmetry 502-2 by controllably energizing the first and third coils 504-1, 504-3 with alternating electrical currents that are equal in amplitude and 90-degrees out of phase.

It was previously noted that the gear ratios of the gearboxes 110 is such that the output torque of the electromagnetic machine 100 is increased. More specifically, and as may be appreciated, the gearboxes each have gear ratio greater than 1.0. Thus, the output torque of the spherical body 302 and/or the first and second hemispherical bodies 106, 108 is increase by an amount proportional to the gear ratio. For example, if the output torque before the gearboxes 110 is 16.3 millinewton meter, and the gear ratio is 150, the output torque after the gearbox is about 2.4 newton meter.

The spherical electromagnetic machine 100 described herein supplies relatively higher output torque as compared to presently known spherical electromagnetic machines.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A geared spherical electromagnetic machine with two-axis rotation, comprising:
    an inner frame;
    an outer frame disposed adjacent to, and configured to rotate relative to, the inner frame;
    a spherical body having a first axis of symmetry, a second axis of symmetry, a third axis of symmetry, the first, second, and third axes of symmetry disposed perpendicular to each other, the spherical body rotationally coupled to the inner frame, the spherical body rotatable, relative to the inner frame and the outer frame, about the first axis of symmetry;
    a first coil wound on the spherical armature about the first axis of symmetry;
    a second coil wound on the spherical armature about the second axis of symmetry;
    a third coil wound on the spherical armature about the third axis of symmetry;
    a first hemispherical body spaced apart from, and surrounding a first portion of, the spherical body, the first hemispherical body rotationally coupled to the outer frame, the first hemispherical body rotatable, relative to the inner frame, the outer frame, and the spherical body, about the second axis of symmetry, the first hemispherical body including a first hemispherical body inner surface and a first hemispherical body outer surface;
    a second hemispherical body spaced apart from, and surrounding a second portion of, the spherical body, the second hemispherical body rotationally coupled to the outer frame, the second hemispherical body rotatable, relative to the inner frame, the outer frame, and the spherical body, about the second axis of symmetry, the second hemispherical body including a second hemispherical body inner surface and a second hemispherical body outer surface;
    a first plurality of inner magnets coupled to the first hemispherical body inner surface;
    a second plurality of inner magnets coupled to the second hemispherical body inner surface;
    a first gearbox mounted on the inner frame and coupled to the spherical body; and
    a second gearbox mounted on the outer frame and coupled to the first hemispherical body.

2. The geared spherical electromagnetic machine of claim 1, further comprising:
    a third gearbox mounted on the outer frame and coupled to the second hemispherical body.

3. The geared spherical electromagnetic machine of claim 2, wherein the first, second, and third gearbox each have a gear ratio greater than 1.0.

4. The geared spherical electromagnetic machine of claim 1, wherein each of the inner magnets is shaped like a fraction of a hemisphere.

5. The geared spherical electromagnetic machine of claim 1, further comprising:

a first plurality of outer magnets coupled to the first hemispherical body outer surface; and
a second plurality of outer magnets coupled to the second hemispherical body outer surface.

6. The geared spherical electromagnetic machine of claim 5, wherein each of the first plurality of outer magnets and each of the second plurality of outer magnets is arc shaped.

7. The geared spherical electromagnetic machine of claim 1, further comprising:
a first shaft coupled to the spherical body and the first gearbox; and
a first bearing disposed between the first shaft and the inner frame.

8. The geared spherical electromagnetic machine of claim 7, further comprising:
a second shaft coupled to the spherical body;
a mounting flange fixedly coupled to the inner frame and adapted to be fixedly mounted to a structure; and
a slip ring coupled to the second shaft and the mounting flange.

9. The geared spherical electromagnetic machine of claim 8, further comprising:
a second shaft coupled to the first hemispherical body and the second gearbox; and
a second bearing disposed between the second shaft and the outer frame.

10. The geared spherical electromagnetic machine of claim 9, further comprising:
a third shaft coupled to the second hemispherical body and the third gearbox; and
a third bearing disposed between the third shaft and the outer frame.

11. A geared spherical motor with two-axis rotation, comprising:
an inner frame;
an outer frame disposed adjacent to, and configured to rotate relative to, the inner frame;
a spherical body having a first axis of symmetry, a second axis of symmetry, a third axis of symmetry, the first, second, and third axes of symmetry disposed perpendicular to each other, the spherical body rotationally coupled to the inner frame, the spherical body rotatable, relative to the inner frame and the outer frame, about the first axis of symmetry;
a first coil wound on the spherical armature about the first axis of symmetry;
a second coil wound on the spherical armature about the second axis of symmetry;
a third coil wound on the spherical armature about the third axis of symmetry;
a first hemispherical body spaced apart from, and surrounding a first portion of, the spherical body, the first hemispherical body rotationally coupled to the outer frame, the first hemispherical body rotatable, relative to the inner frame, the outer frame, and the spherical body, about the second axis of symmetry, the first hemispherical body including a first hemispherical body inner surface and a first hemispherical body outer surface;
a second hemispherical body spaced apart from, and surrounding a second portion of, the spherical body, the second hemispherical body rotationally coupled to the outer frame, the second hemispherical body rotatable, relative to the inner frame, the outer frame, and the spherical body, about the second axis of symmetry, the second hemispherical body including a second hemispherical body inner surface and a second hemispherical body outer surface;

a first plurality of inner magnets coupled to the first hemispherical body inner surface;
a second plurality of inner magnets coupled to the second hemispherical body inner surface;
a first gearbox mounted on the inner frame and coupled to the spherical body;
a second gearbox mounted on the outer frame and coupled to the first hemispherical body; and
a third gearbox mounted on the outer frame and coupled to the second hemispherical body,
wherein the first, second, and third gearbox each have a gear ratio greater than 1.0.

12. The spherical motor of claim 11, wherein each of the inner magnets is shaped like a fraction of a hemisphere.

13. The spherical motor of claim 11, further comprising:
a first plurality of outer magnets coupled to the first hemispherical body outer surface; and
a second plurality of outer magnets coupled to the second hemispherical body outer surface.

14. The spherical motor of claim 13, wherein each of the first plurality of outer magnets and each of the second plurality of outer magnets is arc shaped.

15. The geared spherical electromagnetic machine of claim 11, further comprising:
a first shaft coupled to the spherical body and the first gearbox; and
a first bearing disposed between the first shaft and the inner frame.

16. The geared spherical electromagnetic machine of claim 15, further comprising:
a second shaft coupled to the spherical body;
a mounting flange fixedly coupled to the inner frame and adapted to be fixedly mounted to a structure; and
a slip ring coupled to the second shaft and the mounting flange.

17. The geared spherical electromagnetic machine of claim 16, further comprising:
a second shaft coupled to the first hemispherical body and the second gearbox; and
a second bearing disposed between the second shaft and the outer frame.

18. The geared spherical electromagnetic machine of claim 17, further comprising:
a third shaft coupled to the second hemispherical body and the third gearbox; and
a third bearing disposed between the third shaft and the outer frame.

19. A geared spherical motor with two-axis rotation, comprising:
an inner frame;
an outer frame disposed adjacent to, and configured to rotate relative to, the inner frame;
a spherical body having a first axis of symmetry, a second axis of symmetry, a third axis of symmetry, the first, second, and third axes of symmetry disposed perpendicular to each other, the spherical body rotationally coupled to the inner frame, the spherical body rotatable, relative to the inner frame and the outer frame, about the first axis of symmetry;
a first coil wound on the spherical armature about the first axis of symmetry;
a second coil wound on the spherical armature about the second axis of symmetry;
a third coil wound on the spherical armature about the third axis of symmetry;
a first hemispherical body spaced apart from, and surrounding a first portion of, the spherical body, the first hemispherical body rotationally coupled to the outer frame, the first hemispherical body rotatable, relative to the inner frame, the outer frame, and the spherical body, about the second axis of symmetry, the first hemispherical body including a first hemispherical body inner surface and a first hemispherical body outer surface;
a second hemispherical body spaced apart from, and surrounding a second portion of, the spherical body, the second hemispherical body rotationally coupled to the outer frame, the second hemispherical body rotatable, relative to the inner frame, the outer frame, and the spherical body, about the second axis of symmetry, the second hemispherical body including a second hemispherical body inner surface and a second hemispherical body outer surface;
a first plurality of inner magnets coupled to the first hemispherical body inner surface;
a first plurality of outer magnets coupled to the first hemispherical body outer surface;
a second plurality of inner magnets coupled to the second hemispherical body inner surface;
a second plurality of outer magnets coupled to the second hemispherical body outer surface;
a first gearbox mounted on the inner frame and coupled to the spherical body;
a second gearbox mounted on the outer frame and coupled to the first hemispherical body;
a third gearbox mounted on the outer frame and coupled to the second hemispherical body;
a first shaft coupled to the spherical body and the first gearbox;
a first bearing disposed between the first shaft and the inner frame;
a second shaft coupled to the first hemispherical body and the second gearbox;
a second bearing disposed between the second shaft and the outer frame;
a third shaft coupled to the second hemispherical body and the third gearbox; and
a third bearing disposed between the third shaft and the outer frame.

\* \* \* \* \*